United States Patent
Kang et al.

(10) Patent No.: US 11,137,041 B2
(45) Date of Patent: Oct. 5, 2021

(54) BRAKE DISK INCLUDING DECARBURIZED LAYER AND NITRIDE COMPOUND LAYER, AND METHOD OF MANUFACTURING THE SAME

(71) Applicants: Hyundai Motor Company, Seoul (KR); KIA Motors Corporation, Seoul (KR)

(72) Inventors: Min Woo Kang, Incheon (KR); Chung An Lee, Hwaseong-si (KR); Seung Hyun Hong, Seoul (KR); Soon Woo Kwon, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 5 days.

(21) Appl. No.: 16/386,685

(22) Filed: Apr. 17, 2019

(65) Prior Publication Data

US 2020/0182318 A1    Jun. 11, 2020

(30) Foreign Application Priority Data

Dec. 11, 2018    (KR) .......................... 10-2018-0158958

(51) Int. Cl.
*F16D 65/12*    (2006.01)
*C21D 9/00*    (2006.01)
(Continued)

(52) U.S. Cl.
CPC ............. *F16D 65/125* (2013.01); *C21D 1/06* (2013.01); *C21D 3/04* (2013.01); *C21D 5/00* (2013.01);
(Continued)

(58) Field of Classification Search
CPC ... C21D 1/06; C21D 3/04; C21D 5/00; C21D 9/0068; C21D 2211/009; C22C 37/00;
(Continued)

(56) References Cited

U.S. PATENT DOCUMENTS 2,324,322 A * 7/1943 Flinn, Jr. ................. C22C 37/00
148/545
4,290,510 A * 9/1981 Warren ..................... C23C 4/06
188/218 XL (Continued)

FOREIGN PATENT DOCUMENTS

CN    201763859 U  *  3/2011
CN    102308112 A     1/2012
(Continued)

*Primary Examiner* — Robert A. Siconolfi
*Assistant Examiner* — Mahbubur Rashid (57) ABSTRACT

A brake disk includes a basic material formed of gray cast iron, a decarburized layer formed on the basic material and formed via decarburizing, and a nitride compound layer formed on the decarburized layer and formed via nitriding of a nitride. A method of manufacturing a brake disk includes preparing a disk formed of gray cast iron, performing heat treatment of the disk to form a pre-decarburized layer and a base layer of gray cast iron over which the pre-decarburized layer is formed, and nitriding a portion of the pre-decarburized layer to form a nitride compound layer including a nitride and a decarburized layer over which the nitride compound layer is formed.

6 Claims, 4 Drawing Sheets

(51) Int. Cl.
*C21D 5/00* (2006.01)
*C21D 1/06* (2006.01)
*C21D 3/04* (2006.01)
*C23C 8/26* (2006.01)
*C22C 37/00* (2006.01)
*C23C 8/02* (2006.01)
*F16D 65/02* (2006.01)

(52) U.S. Cl.
CPC ............ *C21D 9/0068* (2013.01); *C22C 37/00* (2013.01); *C23C 8/02* (2013.01); *C23C 8/26* (2013.01); *F16D 65/127* (2013.01); *C21D 2211/009* (2013.01); *F16D 2065/132* (2013.01); *F16D 2200/0013* (2013.01); *F16D 2250/0038* (2013.01)

(58) Field of Classification Search
CPC . C23C 8/02; C23C 8/26; F16D 65/127; F16D 2065/132; F16D 2200/0013; F16D 2250/0038
See application file for complete search history.

(56) References Cited

U.S. PATENT DOCUMENTS

| | | | | |
|---|---|---|---|---|
| 4,341,840 A | * | 7/1982 | Prewo | C03C 14/002 428/367 |
| 5,242,710 A | * | 9/1993 | Claar | C04B 35/652 427/248.1 |
| 5,620,791 A | * | 4/1997 | Dwivedi | C22C 1/1015 188/218 XL |
| 5,901,818 A | * | 5/1999 | Martino | F16D 65/125 188/18 A |
| 6,086,688 A | * | 7/2000 | Doutre | C22C 1/1036 148/437 |
| 7,588,609 B2 | * | 9/2009 | Khan | F16D 69/025 310/252 |
| 7,823,763 B2 | * | 11/2010 | Sachdev | B23K 20/12 228/112.1 |
| 8,287,667 B2 | * | 10/2012 | Holly | F16D 65/127 148/318 |
| 8,771,438 B2 | | 7/2014 | Lee et al. | |
| 2003/0024608 A1 | * | 2/2003 | Cooper | C21D 5/00 148/321 |
| 2004/0031652 A1 | * | 2/2004 | Khambekar | F16D 65/127 188/218 XL |
| 2007/0286961 A1 | * | 12/2007 | Pahle | C23C 4/04 427/449 |
| 2011/0041960 A1 | * | 2/2011 | Takahashi | C22C 33/08 148/321 |
| 2011/0278116 A1 | * | 11/2011 | Lembach | F16D 69/02 188/218 XL |
| 2011/0293849 A1 | * | 12/2011 | Lembach | F16D 65/127 427/535 |
| 2011/0297495 A1 | * | 12/2011 | Hanna | F16D 65/12 188/218 R |
| 2013/0153345 A1 | * | 6/2013 | Kuckert | F16D 65/127 188/218 XL |
| 2013/0161136 A1 | * | 6/2013 | Huschenhoefer | F16D 65/127 188/218 XL |
| 2013/0161137 A1 | * | 6/2013 | Huschenhoefer | C23C 8/02 148/217 |
| 2013/0284318 A1 | * | 10/2013 | Lee | C23C 8/02 148/217 |
| 2014/0060983 A1 | * | 3/2014 | Sugai | F16D 65/127 188/218 XL |
| 2014/0332330 A1 | * | 11/2014 | Orr | F16D 65/127 188/218 XL |
| 2015/0004048 A1 | * | 1/2015 | Watanabe | C22C 37/00 420/26 |
| 2015/0096850 A1 | * | 4/2015 | Hanna | F16D 65/10 188/218 XL |
| 2015/0159710 A1 | * | 6/2015 | Holly | C23C 8/04 188/218 XL |
| 2015/0376747 A1 | * | 12/2015 | Tyou | F16D 65/125 420/15 |

FOREIGN PATENT DOCUMENTS

| | | |
|---|---|---|
| CN | 106011736 A | 10/2016 |
| JP | 2000-337410 A | 12/2000 |
| JP | 2007-319990 A | 12/2007 |
| KR | 10-2004-0067168 A | 7/2004 |
| KR | 10-0791210 B1 | 1/2008 |
| KR | 10-2009-0111586 A | 10/2009 |
| KR | 10-1288830 B1 | 7/2013 |
| KR | 10-2013-0121269 A | 11/2013 |

\* cited by examiner

BRAKE DISK INCLUDING DECARBURIZED LAYER AND NITRIDE COMPOUND LAYER, AND METHOD OF MANUFACTURING THE SAME

CROSS REFERENCE TO RELATED APPLICATION

The present application claims priority to Korean Patent Application No. 10-2018-0158958, filed Dec. 11, 2018, the entire contents of which is incorporated herein for all purposes by this reference.

BACKGROUND

1. Technical Field

The present disclosure relates to a brake disk.

2. Description of the Related Art

A disk brake type brake apparatus of a vehicle is an apparatus for integrally rotating a cylindrical type brake disk with a wheel and is an apparatus for pushing opposite sides of the brake disk against a brake pad operated by a hydraulic piston to generate a frictional force and braking or stopping a vehicle with the frictional force.
A general material of the brake disk of the aforementioned disk brake type brake apparatus is gray cast iron with excellent castability, thermal conductivity, vibration damping capacity, and wear resistance.

SUMMARY

An aspect of the present disclosure provides a brake disk which may have excellent erosion resistance, low crack generation due to thermal fatigue, and excellent wear resistance by performing heat treatment for a short time to reduce a processing time to generate a thick nitride compound layer, and a method of manufacturing the brake disk. Another aspect provides a brake disk including a decarburized layer and a nitride compound layer and having low crack generation due to thermal fatigue, and excellent erosion resistance and wear resistance.

According to an embodiment of the present disclosure, a brake disk includes a basic material formed of gray cast iron, a decarburized layer formed on the basic material and formed via decarburizing, and a nitride compound layer formed on the decarburized layer and formed of nitride via nitriding.

The decarburized layer may have an average thickness of 5 to 10 μm.

The decarburized layer and the nitride compound layer may have a thickness ratio of 0.2 to 1:1.

Gray cast iron of the basic material may include a graphite structure and a pearlite structure.

The basic material may include 0.05 wt % to 0.2 wt % of titanium based on a total weight of the basic material.

The basic material and the decarburized layer may include precipitated carbide.

The carbide included in the decarburized layer may be equal to or less than 3% based on a total weight of the decarburized layer.

The carbide included in the decarburized layer may include titanium carbide.

According to another embodiment of the present disclosure, a method of manufacturing a brake disk includes preparing a basic material formed of gray cast iron, performing heat treatment on one surface of the basic material to form a pre-decarburized layer, and nitriding a portion of the pre-decarburized layer to form a nitride compound layer including a nitride on a surface of the pre-decarburized layer.

The performing of the heat treatment may be performed for 15 minutes to 60 minutes at 680° C. to 750° C. The basic material prepared in the preparation may include precipitated carbide, and the carbide that remains in the pre-decarburized layer after the performing of the heat treatment may have a content equal to or less than 3% based on a total weight of the pre-decarburized layer.

The nitriding may be performed on the pre-decarburized layer under an atmosphere of reaction gas including ammonia, nitrogen, and carbon dioxide.

The reaction gas may include ammonia, nitrogen, and carbon dioxide with a volume ratio of 5 to 7:2 to 4:1.

The nitriding may be performed for 3 hours to 8 hours at 550° C. to 600° C.

DETAILED DESCRIPTION OF EMBODIMENTS

Hereinafter, embodiments will be described in detail by embodiments of the disclosure. This is not intended to limit the present disclosure to the embodiments of the present disclosure and may be changed in various forms as long as the essence of the present disclosure is not changed.

It will be further understood that the terms "comprises" and/or "comprising" when used in this specification, specify the presence of other components. In addition, it will be understood that any numbers and representations indicating an amount, a reaction condition, and the like of components described in the specification is defined by the term "about" unless the context clearly indicates otherwise.

Gray cast iron that is used for a brake material is disadvantageous in that rust is generated on a surface thereof while being exposed to the air to degrade the quality of an outer appearance due to low erosion resistance. To supplement low erosion resistance that is the disadvantage of gray cast iron, a method of oxy-nitriding a surface of gray cast iron may be used.

The oxy-nitriding method uses a gas nitriding heat treatment method, and the gas nitriding heat treatment method is a method of adsorbing and diffusing dissociated nitrogen obtained by decomposing ammonia gas at 500 to 550° C. which is equal to or less than $A_1$ transformation temperature (725° C.) of steel, on a steel surface. As described above, in the gas nitriding heat treatment method, nitrogen diffused into a deep part of steel is combined with an iron element to generate a nitride compound layer such as $\varepsilon(Fe_{2-3}N)$ or $\gamma'(Fe_3N)$, and the nitride compound layer has excellent fatigue resistance and wear resistance with respect to an external force and, simultaneously, has high erosion resistance.

However, in gray cast iron as a material of a brake disk, it is not easy to diffuse nitrogen in pearlite and graphite that has a matrix structure of the gray cast iron compared with ferrite of low carbon steel, and thus, it is disadvantageous that a depth of the generated nitride compound layer is very small, and a thickness thereof is not uniform, and thus, heat treatment needs to be performed for a long time. As described above, the oxy-nitrided brake disk is formed in such a way that graphite is present within or just below the nitride compound layer, and thus, a nitride compound layer is easily peeled by thermal fatigue or impact due to separation of an interface between the graphite and a matrix structure due to a different in thermal expansion coefficient therebetween, thereby causing a judder phenomenon.

Brake Disk

Figure 1:
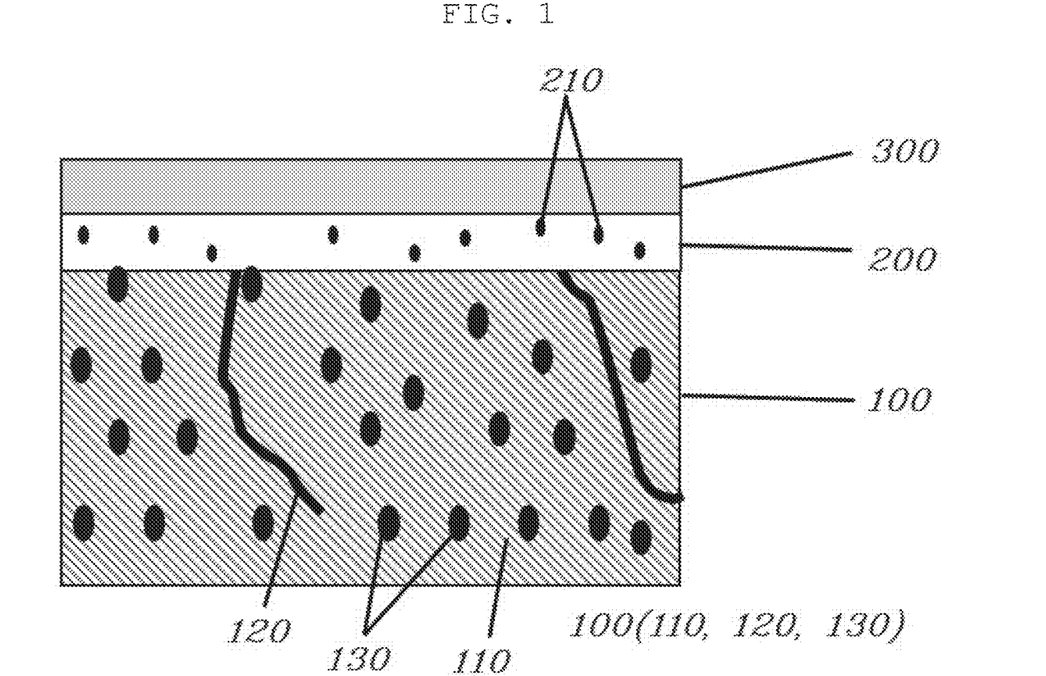
FIG. 1 is a cross-sectional view of a brake disk according to an embodiment of the present disclosure.

A brake disk according to the present disclosure may include a basic material layer formed of gray cast iron, a decarburized layer formed on the basic material and including carbide, and a nitride compound layer formed on the decarburized layer and including a nitride FIG. 1 is a cross-sectional view of a brake disk according to an embodiment of the present disclosure. Referring to FIG. 1, a brake disk 10 according to the present disclosure may include a basic material layer 100 formed of gray cast iron, a decarburized layer 200 formed on the basic material layer 100 and formed via decarburizing, and a nitride compound layer 300 formed on the decarburized layer 200 and formed of nitride via nitriding.

The basic material layer 100 is not particularly limited as long as a material of the basic material layer 100 includes gray cast iron that is generally used to form a brake disk, and for example, may further include titanium (Ti) in addition to a gray cast iron component. In one embodiment, the basic material layer 100 may include 0.05 wt % to 0.2 wt % of Ti based on a total weight of the basic material. In another embodiment, the basic material layer 100 may include 0.08 wt % to 0.15 wt % of Ti based on a total weight of the basic material. When the basic material includes Ti within the above content range, carbide 130 such as titanium carbide (TiC) may be precipitated in the basic material to achieve an effect of enhancing the wear resistance of the brake disk.

The gray cast iron of the basic material layer 100 may include a graphite structure 120 and a pearlite structure 110.

The decarburized layer 200 may be formed on the basic material layer 100 and may be present between the basic material layer 100 and the nitride compound layer 300 to enhance the erosion resistance of the brake disk and to reduce a crack due to thermal fatigue. In addition, the decarburized layer 200 may include carbide 210.

In embodiments, the decarburized layer 200 may refer to the remaining part except for a portion that is obtained by decarburization-processing a surface of the basic material layer 100 to form a pre-decarburized layer 200a and then nitriding a surface of the pre-decarburized layer 200a and converting the pre-decarburized layer 200a into the nitride compound layer 300 including a nitride. In the present disclosure, a decarburization-processed region before the nitride compound layer 300 is formed after a decarburization-process is defined as the pre-decarburized layer 200a, and the remaining portion when a portion of pre-decarburized layer 200a is converted into the nitride compound layer 300 after nitriding is defined as the decarburized layer 200.

The amount of the carbide 130 that has been formed on the basic material layer 100 may be reduced during the decarburization-process for forming the pre-decarburized layer. However, the remaining carbide 210 may prevent growth of crystal grain and compensate for lowered hardness via decarburizing, and thus, a predetermined amount of the carbide 210 may remain. However, in embodiments, there is a limit in content of an element such as Ti for forming the carbides 130 and 210, and when the amount of the carbide 210 exceeds 3%, the size of the carbide 210 may be increased to a level of several to several tens of μm, and in this case, the carbide 210 may function as a starting point of fatigue failure due to mismatch with an interface of the basic material layer 100. Accordingly, the amount of the carbide 210 that remains in the decarburized layer 200 may be limited to 3% or less.

The decarburized layer 200 may be obtained by decarburizing a portion of the basic material layer 100 and formed on the basic material layer 100 and may be a ferrite structure including the carbide 210 that remains after a decarburization-process.

The decarburized layer 200 may have an average thickness of 5 μm to 10 μm. When the average thickness of the decarburized layer 200 is within the above range, risks that the nitride compound layer is peeled from the basic material layer 100 due to thermal fatigue or external force may be avoided or prevented to achieve an effect of enhancing the wear resistance and the erosion resistance of the brake disk.

The nitride compound layer 300 may enhance the wear resistance and the erosion resistance of the brake disk, may be formed on the decarburized layer 200, and may include a nitride. In embodiments, the nitride compound layer 300 may be formed by nitriding a portion of the pre-decarburized layer 200a formed by performing a decarburization-process on a surface of the basic material layer 100, for example, a surface of the pre-decarburized layer 200a. In one embodiment, the nitride compound layer 300 may include iron nitride. For example, the nitride compound layer 300 may include $Fe_{2-3}N$ or $Fe_3N$.

A thickness ratio of the decarburized layer 200 and the nitride compound layer 300 may be 0.2 to 1:1. When the thickness ratio of the decarburized layer 200 and the nitride compound layer 300 is within the above range, an effect of enhancing the wear resistance of the brake disk to enhance the durability thereof may be achieved.

The carbides 130 and 210 may increase the hardness of the brake disk and may be, for example, carbide of titanium (Ti). In embodiments, the carbides 130 and 210 may be titanium carbide.

Method of Manufacturing Brake Disk

Figure 2A:
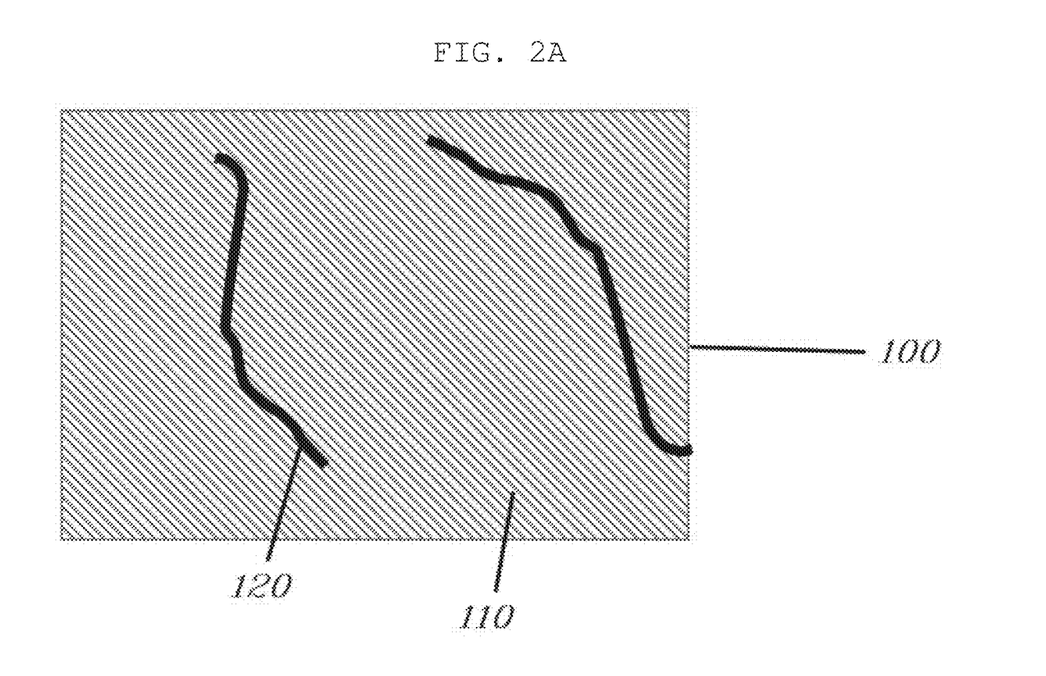
FIGS. 2A to 2C are diagrams showing operations of manufacturing a brake disk according to an embodiment of the present disclosure.
Figure 2B:
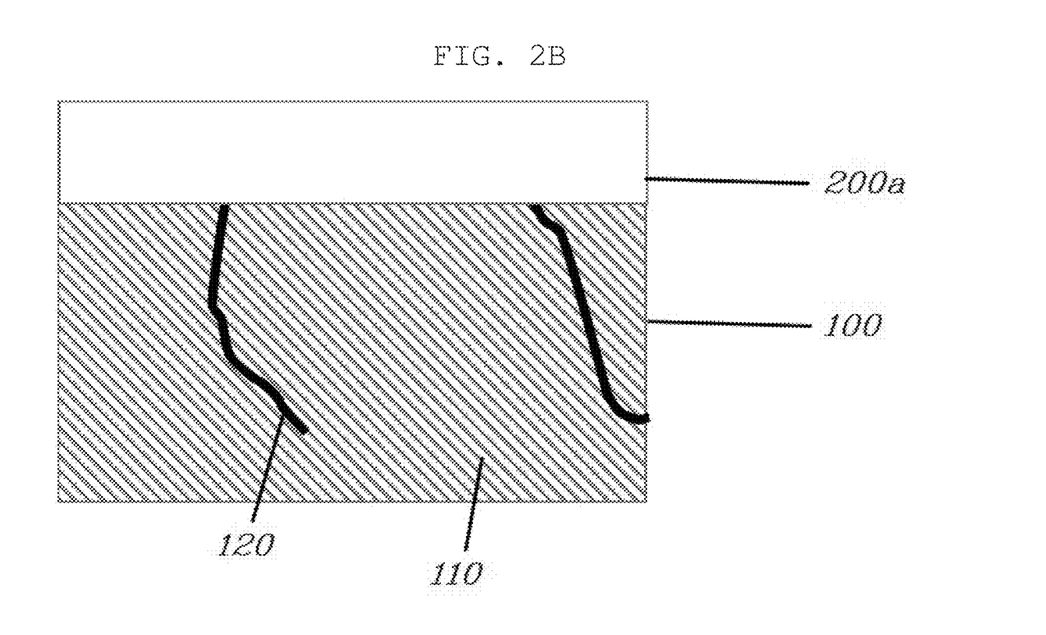
Figure 2C:
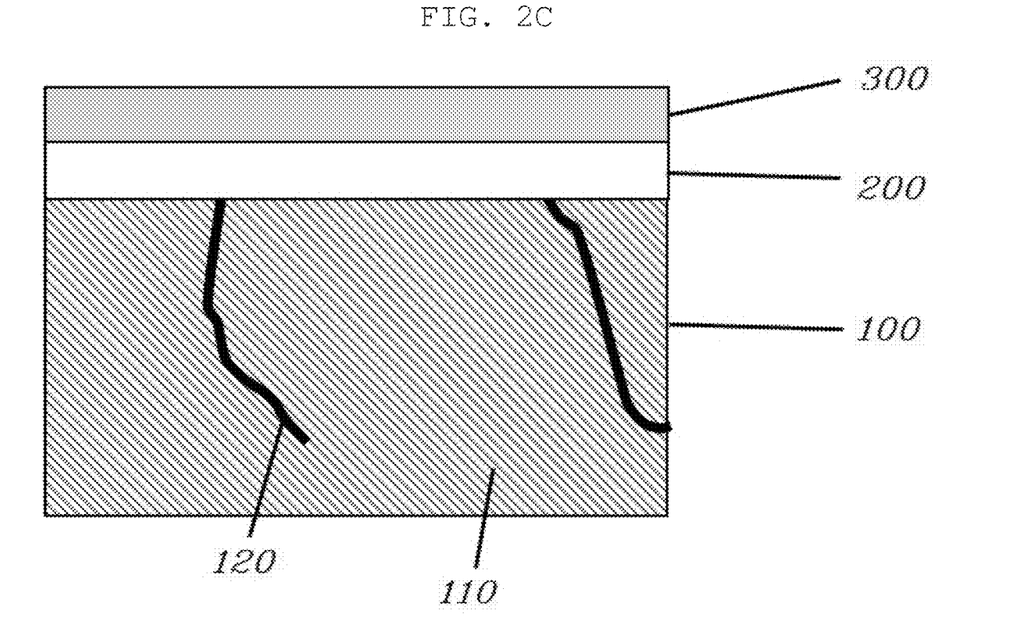

FIGS. 2A to 2C are diagrams showing operations of manufacturing a brake disk according to an embodiment of the present disclosure. As shown in FIGS. 2A to 2C, the method of manufacturing the brake disk according to the present disclosure may include an preparation operation of preparing a basic material formed of gray cast iron, a decarburization-processing operation of performing heat treatment on one surface of the basic material to form a pre-decarburized layer, and a nitriding operation of nitriding a portion of the pre-decarburized layer to form a nitride compound layer including a nitride on a surface of the pre-decarburized layer.

Preparation Operation

As shown in FIG. 2A, in the preparation operation, a basic material formed of gray cast iron may be prepared.

The basic material layer 100 is not particularly limited as long as a material of the basic material layer 100 includes gray cast iron that is generally used to form a brake disk, and for example, may further include titanium (Ti). When the basic material includes Ti, titanium carbide is generated on the carbide 130 precipitated during formation of the basic material to prevent growth of crystal grain, and compared with vanadium (V) and niobium (Nb), a remaining rate of precipitated carbide after heat treatment may be high to achieve an effect of increasing the hardness of the decarburized layer.

In one embodiment, the basic material layer 100 may include 0.05 wt % to 0.2 wt % of Ti based on a total weight of the basic material. In another embodiment, the basic material layer 100 may include 0.08 wt % to 0.15 wt % of Ti based on a total weight of the basic material. When the basic material layer 100 includes Ti within the above content range, an effect of increasing the wear resistance of the brake disk may be achieved.

Gray cast iron of the basic material layer 100 may include the graphite structure 120 and the pearlite structure 110.

Decarburization-Processing Operation

As shown in FIG. 2B, in the decarburization-processing operation, heat treatment may be performed on one surface of the basic material layer 100 to form the pre-decarburized layer 200a including the precipitated carbide 210. The method of manufacturing the brake disk according to the present disclosure may perform the aforementioned decarburization-processing operation, and thus, the pre-decarburized layer 200a into which nitrogen is easily diffused may be formed on the basic material layer 100 and, then, may be nitrided, and thus, an interface of the nitride compound layer 300 and the graphite structure 120 of the basic material layer 100 may prevent a crack due to thermal fatigue, thereby achieving an effect of forming a nitride compound layer with a target thickness for a short time.

In one embodiment, in the decarburization-processing operation, heat treatment may be performed on one surface of the basic material layer 100 to form the pre-decarburized layer 200a including the precipitated carbide 210 on the basic material layer 100. In another embodiment, in the decarburization-processing operation, heat treatment may be performed on one surface of the basic material layer 100 to form the pre-decarburized layer 200a with a ferrite structure including the precipitated carbide 210 on the basic material layer 100.

The decarburization-processing operation may be performed for 15 minutes to 60 minutes at 680° C. to 750° C. In embodiments, the decarburization-processing operation may be performed for 15 minutes to 40 minutes, 20 minutes to 40 minutes, or 20 minutes to 35 minutes at 680° C. to 730° C., 690° C. to 730° C., 690° C. to 720° C., or 690° C. to 710° C. When heat treatment is performed for the time and temperature within the above range, the pre-decarburized layer 200a with a target thickness may be formed for a short time.

The decarburization-processing operation may be performed under a reducing atmosphere. In embodiments, the decarburization-processing operation may be performed under an atmosphere of gas including one or more selected from the group consisting of reducing gas such as $H_2$ and CO and inert gas such as $N_2$ and Ar. When heat treatment is performed under a reducing atmosphere, an effect of preventing oxide of iron that adversely affects the brake disk from being generated may be achieved.

When the decarburized layer 200, which remains without being nitrided in the nitriding operation, has a too small thickness or is removed, a direct interface may be formed between the basic material layer 100 and the nitride compound layer 300 to cause a crack in the decarburized layer 200 due to external thermal impact or mechanical impact. Further, the crack may be propagated directly to the basic material layer 100 or the decarburized layer 200 is peeled in terms of a contact point between the decarburized layer 200 and the graphite structure 120 present on the basic material layer 100, and anti-erosion performance may be noticeably lowered. Also, the carburized layer which is too thick may adversely affect wear resistance as the decarburized layer has low mechanical properties. To avoid or minimize the potential risks discussed above, in the decarburization-processing operation according to embodiments, the pre-decarburized layer 200a may have a thickness of 10 µm to 60 µm.

In the decarburization-processing operation, the amount of the precipitated carbide 130 formed in the basic material layer 100 may be reduced, and in this case, the amount of the precipitated carbide 210 that remains in the pre-decarburized layer 200a may be maintained at a level equal to or less than 3%.

Nitriding Operation

As shown in FIG. 2C, in the nitriding operation, a portion of the pre-decarburized layer 200a, for example, a surface of the pre-decarburized layer 200a may be nitrided to form the nitride compound layer 300 including a nitride, and simultaneously, a portion of the pre-decarburized layer 200a, which is not nitrided, may be defined as the decarburized layer 200. The brake disk according to the present disclosure may perform the aforementioned nitriding operation, and thus, the erosion resistance of the brake disk may be enhanced, thereby an effect of preventing or minimizing degradation of the quality of an outer appearance due to rust generated on a surface of the brake disk while the brake disk is exposed to the air.

The nitriding operation may be performed on the pre-decarburized layer 200a under an atmosphere of reaction gas including ammonia, nitrogen, and carbon dioxide. In embodiments, the reaction gas may include ammonia, nitrogen, and carbon dioxide with a volume ratio of 5 to 7:2 to 4:1, 5.5 to 7:2.5 to 4:1, 5.5 to 6.5:2.5 to 3.5:1, or 5.8 to 6.3:2.8 to 3.2:1.

In embodiments, the nitriding operation may be performed for 3 hours to 8 hours, 4 hours to 7 hours, or 4 hours to 6 hours at 550° C. to 600° C., 570° C. to 600° C., or 570° C. to 590° C.

The nitriding operation is limited to the proposed reaction gas atmosphere, temperature, and time because a value Kn that is a nitrogen potential number is appropriately managed to easily form a nitride compound layer when the proposed condition is satisfied.

The nitriding operation may be processed in such a way that the thickness of the nitride compound layer 300 is 0.4 to 0.85 times the total thickness of the decarburized layer 200 in the decarburization-processing operation. In embodiments, the nitriding operation may be processed in such a way that the thickness of the nitride compound layer 300 is 0.4 times to 0.8 times, 0.5 times to 0.8 times, or 0.5 times to 0.75 times the total thickness of the decarburized layer 200 in the decarburization-processing operation. When the nitriding operation is processed in such a way that the total thickness of the decarburized layer 200 is within the above range, thereby achieving an effect of enhancing the wear resistance of the brake disk to enhance durability.

Hereinafter, examples of the present disclosure will be described in detail. However, they are merely examples of the present disclosure, and thus, the scope of the present disclosure is not intended to be limited by the examples.

EXAMPLES

Example 1. Manufacture of Brake Disk

A decarburization-processing operation of forming a pre-decarburized layer was performed under a reducing atmosphere on one surface of a basic material including gray cast iron (which includes a pearlite structure and a graphite structure). Then, nitriding was performed to form a nitride compound layer on a portion of the pre-decarburized layer. Each sample was formed by changing whether the decarburization-processing operation is performed, whether precipitated carbide is present, and a level of nitriding.

For further explanation, Sample 1 was formed by forming only a nitride compound layer with a thickness of about 5 μm without formation of a pre-decarburized layer on a basic material, Sample 2 was formed by forming a pre-decarburized layer with a thickness of about 10 μm on a basic material and then nitriding an entire pre-decarburized layer to form a nitride compound layer with a thickness of about 10 μm, Sample 3 was formed by forming a pre-decarburized layer with a thickness of about 20 μm on a basic material and then nitriding a portion of a pre-decarburized layer to form a nitride compound layer with a thickness of about 13 μm and a decarburized layer with a thickness of about 7 μm, and Sample 4 was formed by forming a pre-decarburized layer with about 20 μm on a basic material including 0.1 wt % of Ti and then nitriding a portion of a pre-decarburized layer to form a nitride compound layer with a thickness of about 13 μm and a decarburized layer with a thickness of about 7 μm.

Test Example 1. Estimation of Physical Properties (1) Hardness

Figure 3:
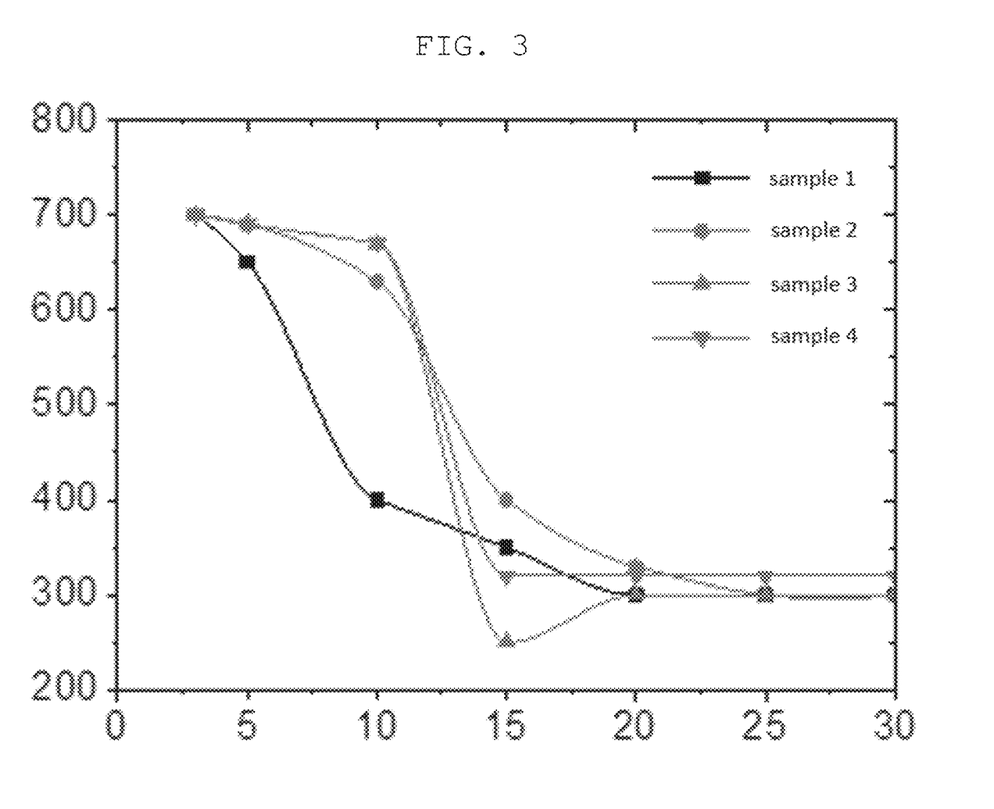
FIG. 3 is a graph showing a measurement result of hardness for each depth in a thickness direction on a surface of samples.

With respect to Samples 1 to 4 prepared as described above Hardness was measured on a surface of each sample for each depth in a thickness direction using a micro Vickers hardness tester, and the result was shown in Table 1 below and FIG. 3.

TABLE 1

| Depth (μm) | Sample 1 | Sample 2 | Sample 3 | Sample 4 |
|---|---|---|---|---|
| 3 | 700 | 700 | 700 | 700 |
| 5 | 650 | 690 | 690 | 690 |
| 10 | 400 | 630 | 670 | 670 |
| 15 | 350 | 400 | 250 | 320 |
| 20 | 300 | 330 | 300 | 320 |
| 25 | 300 | 300 | 300 | 320 |
| 30 | 300 | 300 | 300 | 320 |

As seen from Table 1 above, Sample 1 had hardness that is noticeably degraded at a point with a depth of 10 μm and Samples 2 to 4 had hardness that is degraded at a point with a depth of 15 μm. It may be inferred that, compared with Sample 1, Samples 2 to 4 have surface hardness that is enhanced as a pre-decarburized layer that is a ferrite matrix structure is formed on a surface of a basic material and then a nitride compound layer in which nitrogen is diffused into a ferrite matrix structure is formed.

It may be inferred that, comparing Sample 2 with Samples 3 and 4, hardness of Sample 2 is measured to be relatively high at a point with a depth of 15 μm, and thus, hardness is degraded due to formation of the decarburized layer.

It may be inferred that, comparing Samples 3 and 4, hardness of Sample 4 is measured to be relatively high at a point with a depth of 15 μm, TiC is precipitated by Ti included in a basic material to cause a precipitating hardening phenomenon, and hardness is enhanced along with grain refinement. Accordingly, it may be inferred that, Ti is included in the basic material to overcome degradation in hardness due to formation of the decarburized layer.

(2) Erosion

With respect to Samples 1 to 4, 3% (w/v) of salt water was sprayed and then was left under an atmospheric environment at room temperature, a time when rust is generated was measured, and the result was shown in Table 2 below.

(3) Judder Durability Experiment

With respect to Samples 1 to 4, judder durability estimation of 20,000 km was performed and then abrasion loss of each sample was measured, and the result was shown in Table 2 below.

TABLE 2

| Division | | Sample 1 | Sample 2 | Sample 3 | Sample 4 |
|---|---|---|---|---|---|
| Time taken to cause erosion after 3% of salt water is sprayed | | 2 hours | 60 hours | 60 hours | 60 hours |
| Judder durability experiment | Abrasion loss (μm) | 20 | 16 | 10 | 8 |

As seen from Table 2 above, compared with Sample 1, rust generation was significantly delayed in Samples 2 to 4. It may be inferred that erosion resistance is enhanced as a nitride compound layer is stably formed due to formation of the pre-decarburized layer in Samples 2 to 4.

It may be inferred that Sample 4 including Ti has reduced abrasion loss compared with other samples because of an effect of precipitation of TiC.

Test Example 2. Friction Abrasion Experiment

To know abrasion properties depending on the thickness of a decarburized layer formed on a basic material, one surface of a basic material formed of gray cast iron (which includes a pearlite structure and a graphite structure) was decarburization-processed under a reducing atmosphere to form a pre-decarburized layer with a thickness of 20 μm. Then, a surface of the pre-decarburized layer was nitrided to form a nitride compound layer on an entire or partial portion of the pre-decarburized layer. In this case, after nitriding, the thickness of the decarburized layer and the nitride compound layer of Samples 5 to 10 was adjusted as shown in Table 3 below, and a prepared sample was processed for 30 minutes at friction speed of 5 Hz with a load of 200 N at 150° C. using a reciprocating friction abrasion tester. Then, roughness was measured, and the result was shown in FIG. 3.

TABLE 3

| | Manufactured brake disk | | |
|---|---|---|---|
| Division | Thickness of decarburized layer (μm) | Thickness of nitride compound layer (μm) | Roughness (Ra, μm) |
| Sample 5 | — | 20 | 20 |
| Sample 6 | 3 | 17 | 17 |
| Sample 7 | 5 | 15 | 2 |
| Sample 8 | 8 | 12 | 2 |
| Sample 9 | 10 | 10 | 2 |
| Sample 10 | 12 | 8 | 12 |

As seen from Table 3 above, Samples 7 to 9 had excellent durability due to low roughness even after the friction abrasion experiment.

The brake disk according to the present disclosure may include a relatively thick nitride compound layer, and thus, may have excellent erosion resistance, low crack generation due to thermal fatigue, and excellent wear resistance.

The method of manufacturing the brake disk according to the present disclosure may have an effect of reducing a processing time due to heat treatment that is performed for a short time.

Although the present disclosure has been shown and described with respect to embodiments, it will be apparent to those having ordinary skill in the art that the present disclosure may be variously modified and altered without departing from the spirit and scope of the present disclosure as defined by the following claims.

What is claimed is:

1. A method of manufacturing a brake disk, the method comprising:
    forming a disk with gray cast iron;
    performing heat treatment of the disk to form a pre-decarburized layer and a base layer of gray cast iron over which the pre-decarburized layer is formed; and
    nitriding a portion of the pre-decarburized layer to form a nitride compound layer including a nitride and a decarburized layer over which the nitride compound layer is formed,
    wherein:
        the disk comprises the base layer, the decarburized layer formed over the base layer, and the nitride compound layer formed over the decarburized layer,
        the disk comprises a basic material of gray cast iron that includes precipitated carbide, and
        carbide that remains in the pre-decarburized layer after the performing of the heat treatment has a content equal to or less than 3% based on a total weight of the pre-decarburized layer.

2. The method of claim 1, wherein the performing of the heat treatment is performed for 15 minutes to 60 minutes at 680° C. to 750° C.

3. The method of claim 1, wherein the nitriding is performed on the pre-decarburized layer under an atmosphere of reaction gas including ammonia, nitrogen, and carbon dioxide.

4. The method of claim 3, wherein the reaction gas includes ammonia, nitrogen, and carbon dioxide with a volume ratio of 5 to 7:2 to 4:1.

5. The method of claim 3, wherein the nitriding is performed for 3 hours to 8 hours at 550° C. to 600° C.

6. A brake disk manufactured by a method comprising the steps of:
    forming a disk with gray cast iron;
    performing heat treatment of the disk to form a pre-decarburized layer and a base layer of gray cast iron over which the pre-decarburized layer is formed; and
    nitriding a portion of the pre-decarburized layer to form a nitride compound layer including a nitride and a decarburized layer over which the nitride compound layer is formed,
    wherein:
        the disk comprises the base layer, the decarburized layer formed over the base layer, and the nitride compound layer formed over the decarburized layer,
        the disk comprises a basic material of gray cast iron that includes precipitated carbide, and
        carbide that remains in the pre-decarburized layer after the performing of the heat treatment has a content equal to or less than 3% based on a total weight of the pre-decarburized layer.

* * * * *